Patented Nov. 7, 1950

2,528,656

UNITED STATES PATENT OFFICE 2,528,656

1-HYDROXY-4,7-METHANO-3a,4,7,7a-TETRA-HYDRO 4,5,6,7,8,8-HEXACHLOROINDENE AND METHOD OF PREPARING SAME

Simon H. Herzfeld and Eugene P. Ordas, Chicago, Ill., assignors to Velsicol Corporation, Chicago, Ill., a corporation of Illinois No Drawing. Application July 22, 1948, Serial No. 40,156

8 Claims. (Cl. 260—617)

This application is a continuation-in-part of our co-pending application, Serial No. 735,526, filed March 18, 1947 now abandoned.

This invention relates to the production of new and useful compositions of matter.

More specifically, this invention is concerned with a new composition of matter generally defined as the mono-hydroxy derivative of the adduct of hexachlorocyclopentadiene and cyclopentadiene, and to the method of production thereof.

The Diels-Alder reaction of hexahalocyclopentadienes with cyclopentadiene has been disclosed in the co-pending application of Herzfeld, Lidov and Bluestone, Serial No. 581,172, filed March 5, 1945, and is symbolized as follows:

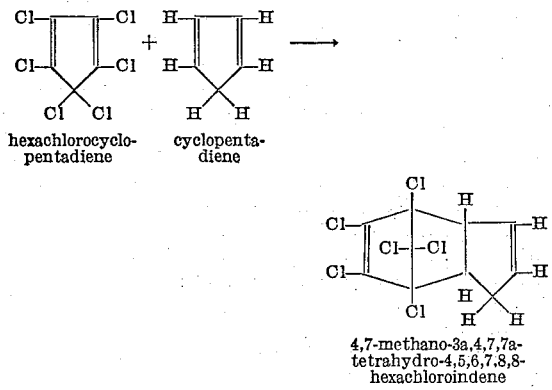

According to "The Ring Index" by Patterson and Capell, A. C. S. Monograph Series, No. 84, 1940, dicyclopentadiene, $C_{10}H_{12}$, is described as 4,7-methano-3a,4,7,7a-tetrahydroindene. Following this accepted system of nomenclature, the adduct of hexachlorocyclopentadiene and cyclopentadiene would be described as 4,7-methano-3a,4,7,7a - tetrahydro - 4,5,6,7,8,8 - hexachloroindene. Hereinafter, for the purpose of brevity, this compound will be referred to as chlordene.

The compound with which this present invention is concerned is the 1-hydroxy derivative of chlordene, which compound is a valuable intermediate in the preparation of insecticides and other new and valuable compositions. In accordance with the present invention, its method of preparation comprises formation of the 1-bromo derivative of chlordene, which in turn is converted to the 1-hydroxy derivative of chlordene by replacing the bromine constituent with an hydroxyl group.

The formation of 1-bromo-chlordene is dependent upon the fact that in the presence of peroxides, bromine reacts with chlordene by substitution at the free methylene group. Small amounts of peroxides are normally contained in the reactants, but to insure a sufficient quantity it is preferable to add organic peroxides such as benzoyl peroxide, lauryl peroxide, or ascaridol, in the ratio of about 0.001 to 0.01 mol peroxide per mol of chlordene. A mol of bromine, or preferably a slight excess thereof should be used per mol of chlordene, however, the ratio of these reactants can be varied over a very wide range and any preference is based on economic rather than technical reasons. Bromination is accomplished by reacting liquid bromine, preferably contained in a relatively inert solvent such as carbon tetrachloride, chloroform, carbon disulfide, tetrachloroethylene or the like, with chlordene contained in a solvent and in the presence of a peroxide as aforesaid. For effective reaction the bromine may be added to the chlordene in the manner illustrated in the subsequent example. The time required for the reaction to proceed to completion, that is, when either or both of the reactants are completely used up, will depend on the concentration of reactants, temperature, agitation, and those other factors normally affecting reaction rates. It is not necessary that the reaction be completed, or that such reaction be terminated at completion, but large excesses of time should be avoided to minimize the formation of side products. The time when the reaction starts, the approximate rate of reaction, and the time when the reaction is completed can be estimated by the rate and duration of time that hydrogen bromide is generated from the reaction mixture. The reaction will proceed to result in the formation of 1-bromo-chlordene over fairly broad ranges of temperature, such as, for example, between about 15–180° C. Reaction temperatures between about room temperature or slightly above to about 120° C. are very satisfactory, and good yields of product can be obtained at a reasonably rapid rate at temperatures of about 45 to 65° C. The reaction temperature can generally be adequately controlled by controlling the rate of introduction of bromine to the reaction mixture, however, external cooling or heating means can be utilized if desired. When the reaction is completed, or is otherwise abated after product is formed, the 1-bromo-chlordene can be isolated by vacuum fractionation or any other method well known to the art. The reaction is almost quantitative, and yields of over 90% based on the theoretical amount can be obtained.

The replacement of the bromine atom in the 1-bromo-chlordene with an hydroxyl group to form the desired 1-hydroxy-chlordene, is accomplished directly by hydrolysis, either in an alkaline or an acid medium, or indirectly by the formation of an intermediate compound which is then easily converted to said hydroxy compound.

The alkaline aqueous hydrolysis is accomplished in the ordinary manner, such as, for example, by treating the 1-bromo-chlordene with an aqueous solution of either a strongly alkaline material such as sodium hydroxide or potassium hydroxide, or a weakly alkaline material such as sodium or potassium carbonate or bicarbonate, or calcium or barium hydroxide. The acid aqueous hydrolysis is also accomplished in the ordinary manner, such as, for example, by treating the 1-bromo-chlordene with an aqueous solution of a mineral acid such as sulfuric acid, p-toluene sulfonic acid, hydrochloric acid, phosphoric acid, trichloroacetic acid, or the like. The amount of acid necessary to effect hydrolysis is not great because as the reaction proceeds, an acid (HBr) is formed. The hydrolysis reaction may be carried out at the reflux temperature of the mixture with rapid agitation for a period of from about one-half to about four days, depending upon such factors as alkalinity, temperature and concentration of reactants. When reaction is over, the mono-hydroxy product can be separated and purified by filtration and recrystallization from a suitable solvent. To enhance the rate of hydrolysis and to insure adequate reaction, it is preferable that the reaction be effected in the presence of a solvent such as an alcohol, like propanol, ethanol, or ethylene glycol or a solvent such as dioxane or the like. The reaction time may be considerably minimized by effecting hydrolysis at temperatures somewhat above 100° C. in homogeneous mixtures. The higher temperatures may be attained by using high boiling solvent or by carrying out the reaction in an autoclave or by using both expedients. Excessively high temperatures such as will decompose the reactants or product should be avoided. Thus, in general, temperatures above about 160° C. are not desirable. The use of temperatures much below 100° C. is not desirable because the rate of reaction is diminished. Since the reaction is one of hydrolysis, there should be sufficient water present to hydrolyze the bromo compound preferably substantially completely. Where a solvent is utilized in the hydrolysis reaction, it can be removed by ordinary means such as distillation at reduced pressure if necessary, and the 1-hydroxy-chlordene can be recovered by filtration and recrystallization, or by any other known means.

An alternative method of conversion of 1-bromo-chlordene to 1-hydroxy-chlordene is by indirect hydrolysis of 1-bromo-chlordene by esterifying it to form the acyloxy derivative of chlordene and subjecting the thereby formed 1-acyloxy-chlordene to alcoholysis; said 1-acyloxy-chlordene and method for preparing same being more particularly described and claimed in our copending application Serial No. 40,155, filed July 22, 1948. The chlordene ester (1-acyloxy-chlordene) may be hydrolyzed to form 1-hydroxy-chlordene in the manner that esters are normally hydrolyzed to result in an alcohol and an acid. However, the alcoholysis reaction is preferred in this instance because if hydrolysis be used, it can be applied directly to bromo-chlordene without the preparation of the intermediate acyloxy compound. The formation of 1-acyloxy-chlordene involves treating 1-bromo-chlordene for from about one-half to about twenty hours or longer, depending on the nature and concentration of the reactants and the temperature employed, with the salt of an organic acid, such as the sodium, potassium or silver salt of acetic, propionic, butyric, benzoic acid, or the like, in the presence of a relatively inert solvent preferably capable of dissolving the reactants substantially completely, such as ethylene glycol, carbitol, propionic acid, dioxane, or preferably glacial acetic acid. Salts of organic acids having up to about twenty carbon atoms per molecule such as valeric, acrylic, butenoic, pentenoic, teracrylic, cinnamic, lauric, elaidic and others, may also be used to form 1-acyloxy-chlordene; however, salts of saturated acids of a relatively low molecular weight, as aforementioned, are preferred in that they are more easily handled, and further, since the formation of an intermediate compound is involved, the use of the cheaper and more available salts is economical. The reaction temperature may vary within a fairly broad range, such as from about normal room temperature to about 170° C., although it should not be so low as to cause the reaction to proceed at an inconveniently slow rate nor so high as to decompose the reactants or the product. A satisfactory, though not necessarily limiting, temperature range is from about 80 to about 150° C. It is convenient to carry out the reaction at the reflux temperature of the solvent employed thereby eliminating the necessity for close temperature control, and thus, the use of a solvent boiling at about 120° C., such a acetic acid, is preferred. The ratio of reactants is not critical although a stoichiometric amount or an excess of the salt reactant is preferred to insure a maximum utilization of the bromo compound and conversion thereof to 1-acyloxy-chlordene. The amount of solvent utilized is also not critical, although a sufficiency thereof to dissolve the reactants and the product is preferred. Large excesses of solvent should be avoided because of the dilution effect on the rate of the reaction. The solvent may be removed from the reaction product by distillation, at reduced pressures if necessary, and the residue, comprising the acyloxy derivative of chlordene can be either directly converted by alcoholysis or ester interchange reaction to the 1-hydroxy-chlordene, or said residue may first be treated to obtain pure 1-acyloxy-chlordene. Purification may be accomplished by distillation in vacuo, by crystallization from suitable solvents, by preferential adsorption on porous materials, or by any other means known to the art.

The alcoholysis, or ester interchange reaction to convert 1-acyloxy-chlordene to 1-hydroxy-chlordene is carried out in the conventional manner (Fieser, L. F. and Fieser, M., Organic Chemistry, 1944) by treating the ester with an alcohol or mixture of alcohols, preferably of a relatively low molecular weight, such as methanol, ethanol, propanol, or ethylene glycol, which alcohols may act both as a solvent and a reactant in the presence of a proper catalyst, such as sulfuric or hydrochloric acid, or such basic compounds as sodium methoxide or sodium acetate. A relatively inert solvent in addition to the alcohol reactant may be utilized, but generally the use of such additional solvent is neither necessary nor preferred. The reaction temperature is that generally utilized in alcoholysis reactions. Thus, very low temperatures are not preferred because the rate of reaction is then inordinately slow, and temperatures above which decomposition of the reactants or product occurs should not be used. Generally temperatures within about 15 to about 160° C. are suitable, although not necessarily restrictive, and more specifically, temperatures between about 80 and 120° C. are preferred as resulting in a maximum yield within a reasonable time. Alcoholic reactants and solvents such as ethanol or propanol are preferred as the reaction may then be effected at the reflux temperatures of these solvents and the necessity for close temperature control is obviated. Under preferred temperature conditions, the reaction is initiated, and some product is formed in a very short period of time, namely, about fifteen minutes. The reaction is usually completed in about six hours, although the reaction may be maintained for longer periods inasmuch as excess reaction time is not deleterious to the product. The ratio of reactants is not critical and large excesses of alcohol may be utilized and even preferred. After reaction, the solvent may be removed by distillation, under reduced pressure if necessary, leaving a product comprising 1-hydroxy-chlordene which can be purified by distillation in vacuo, by crystallization, or by any other known means.

The following is a specific example of the method of our invention, for the purpose of illustration.

*Preparation of 1-bromo-chlordene*

A solution containing 1 mol (339 grams) chlordene and 5 g. lauryl peroxide in 800 ml. carbon tetrachloride was placed into a 2-liter 3-necked flask equipped with a reflux condenser, mechanical stirrer, thermometer and dropping funnel. This solution of chlordene was warmed to 50–55° C. and a bromine solution consisting of 176 grams bromine in 200 ml. carbon tetrachloride was introduced with a slow rate of stirring. The addition of the bromine solution was carried out at such rate as to maintain the temperature of the reaction vessel at 55° C. After addition was completed, the solution was refluxed for one-half hour to insure complete reaction. The reaction mixture was then washed with an excess of sodium bisulfite solution, washed with water, and dried in succession with calcium chloride and anhydrous magnesium sulfate. The solvent was removed in vacuo and the residue distilled at 0.05 mm. pressure. The product thus obtained boiled at 130–132° C.

Analysis: Carbon, 27.64%; Hydrogen, 1.36%; Halogen (as chlorine) 59.75%.

Calculated for $C_{10}H_5Cl_6Br$: Carbon, 28.74%; Hydrogen, 1.21%; Halogen (as chlorine) 59.40%.

The product is, therefore, 1-bromo-chlordene.

*Preparation of 1-hydroxy-chlordene*

To a 2-liter, 2-necked flask was added 800 ml. water, 200 ml. dioxane, 167.2 g. (0.4 mol) 1-bromo-chlordene, and 30.4 g. (0.22 mol) anhydrous potassium carbonate. The flask was equipped with a mechanical stirrer and reflux condenser, and the contents kept at reflux temperature with continuous, vigorous agitation for seventy-five hours. The reaction mixture was then diluted with three volumes of water and stirred until the organic phase solidified. The solid product was filtered, washed with water and dried first in air and then in an evacuated desiccator over potassium hydroxide. This crude product was recrystallized from hexane to yield a product melting at 197–200° C.

Analysis: Carbon, 34.07%; Hydrogen, 1.75%; Chlorine, 59.93%.

Calculated for $C_{10}H_6Cl_6O$: Carbon, 33.84%; Hydrogen, 1.70%; Chlorine, 59.94%.

The product is therefore 1-hydroxy-chlordene.

An alternative method for accomplishing the replacement of the bromine in 1-bromo-chlordene by an hydroxyl group is as follows:

A mixture of 60 grams 1-bromo-chlordene was refluxed with 35.4 grams anhydrous sodium acetate in 180 ml. glacial acetic acid for six hours. The solvent was distilled over to yield 170 ml. of the glacial acetic acid used. The residue comprising 1-acetoxy-chlordene was dissolved in benzene (200 ml.) and the extract was filtered. The solvent was then removed from the filtrate at reduced pressure, and the 1-acetoxy-chlordene was recrystallized from a benzene-petroleum ether mixture.

The thus purified 1-acetoxy-chlordene was then dissolved in methanol using four grams of solvent per gram of residue. A small amount of concentrated hydrochloric acid (1.5 ml. per 60 grams of residue) was added to the solution and the material was refluxed for six hours. The methanol was distilled over at reduced pressure and the residue purified by recrystallization from equal volumes of benzene and hexane. The purified product thus obtained melted at 196–197° C. and resembled in all characteristics the compound obtained by the immediately previous method.

The position of the hydroxyl group introduced into the chlordene molecule to result in the compound of the present invention is, as previously indicated by the numerical designation thereof and by the method of preparation, represented by the following structural formula and accompanying nomenclature:

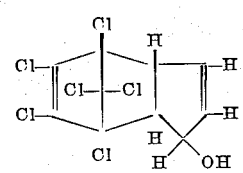

1-hydroxy-4,7-methano-3a,4,7,7a-tetrahydro-4,5,6,7,8,8-hexachloroindene 1-hydroxy-chlordene, the synthesis of which is herein described is a new composition of matter which is useful as an insecticide, or as a starting or intermediate material in the preparation of insecticides and other valuable classes of compounds. Thus, the hydroxyl group may be replaced with a halogen atom to result in a very potent insecticide.

We claim as our invention:

1. As a new composition of matter, 1-hydroxy-4,7 - methano - 3a,4,7,7a - tetrahydro - 4,5,6,7,8,8-hexachloroindene.

2. The method which comprises brominating 4,7 - methano - 3a,4,7,7a - tetrahydro - 4,5,6,7,8,8-hexachloroindene with bromine in the presence of a peroxide at a temperature between about 15 to about 180° C. to form its 1-bromo derivative, and replacing the bromine substituent in said derivative with an hydroxyl group to form 1-hydroxy-4,7-methano-3a,4,7,7a-tetrahydro-4,5,6,7,8,8-hexachloroindene.

3. The method of forming 1-hydroxy-4,7-methano - 3a,4,7,7a-tetrahydro - 4,5,6,7,8,8-hexachloroindene which comprises reacting 4,7-methano - 3a,4,7,7a -tetrahydro - 4,5,6,7,8,8-hexachloroindene with bromine in the presence of a peroxide at a temperature between about 15 to about 180° C. to form 1-bromo-4,7-methano-3a,4,7,7a-tetrahydro-4,5,6,7,8,8-hexachloroindene; and hydrolyzing said 1-bromo compound at a temperature below about 160° C. to replace the bromine atom contained therein with an hydroxyl group.

4. The method of forming 1-hydroxy-4,7-methano-3a,4,7,7a-tetrahydro-4,5,6,7,8,8-hexachloroindene which comprises hydrolyzing 1-bromo-4,7-methano-3a,4,7,7a-tetrahydro-4,5,6,7,8,8-hexachloroindene at a temperature below about 160° C.

5. The method which comprises reacting the 4,7-methano-3a,4,7,7a-tetrahydro-4,5,6,7,8,8-hexachloroindene with bromine in the presence of a relatively inert solvent and an organic peroxide at a temperature between about room temperature to about 120° C. to form the 1-bromo-4,7-methano-3a,4,7,7a-tetrahydro-4,5,6,7,8,8-hexachloroindene, and hydrolyzing said 1-bromo compound at a temperature between about 100 to about 160° C. to replace the bromine atom contained therein with an hydroxyl group.

6. The method which comprises reacting 4,7-methano-3a,4,7,7a-tetrahydro-4,5,6,7,8,8-hexachlorindene with bromine in the presence of a peroxide to form 1-bromo-4,7-methano-3a,4,7,7a-tetrahydro-4,5,6,7,8,8-hexachloroindene at a temperature between about room temperature and 120° C. and hydrolyzing said 1-bromo compound with an aqueous alkaline reagent to produce 1-hydroxy-4,7-methano-3a,4,7,7a-tetrahydro-4,5,6,7,8,8-hexachloroindene.

7. The method which comprises reacting 4,7-methano-3a,4,7,7a-tetrahydro-4,5,6,7,8,8-hexachloroindene with bromine in the presence of a peroxide to form 1-bromo-4,7-methano-3a,4,7,7a-tetrahydro-4,5,6,7,8,8-hexachloroindene at a temperature between about room temperature and about 120° C., hydrolyzing said 1-bromo compound indirectly by esterifying it and subjecting the thereby formed ester to alcoholysis at a temperature between about 15 to about 160° C. to produce 1-hydroxy-4,7-methano-3a,4,7,7a-tetrahydro-4,5,6,7,8,8-hexachloroindene.

8. The method which comprises subjecting 1-acyloxy-4,7-methano-3a,4,7,7a-tetrahydro-4,5,6,7,8,8-hexachloroindene to alcoholysis at a temperature between about 15 to about 160° C. to form 1-hydroxy-4,7-methano-3a,4,7,7a-tetrahydro-4,5,6,7,8,8-hexachloroindene.

SIMON H. HERZFELD.
EUGENE P. ORDAS.

REFERENCES CITED

The following references are of record in the file of this patent:

UNITED STATES PATENTS

| Number | Name | Date |
|---|---|---|
| 2,278,527 | Rust et al. | Apr. 7, 1942 |
| 2,318,033 | Van der Griendt et al. | May 4, 1943 |

OTHER REFERENCES

Fieser et al., "Organic Chemistry," D. C. Heath & Co., Boston Mass. (1944), pages 180, 182, 183 (3 pages.)